United States Patent [19]

Fujiwara et al.

[11] Patent Number: 5,305,129
[45] Date of Patent: * Apr. 19, 1994

[54] LIQUID CRYSTAL DISPLAY DEVICE OF OPTICAL WRITING TYPE HAVING A CARBON DISPERSED LIGHT ABSORBING LAYER AND A CHOLESTERIC REFLECTOR

[75] Inventors: Sayuri Fujiwara; Naofumi Kimura, both of Nara, Japan

[73] Assignee: Sharp Kabushiki Kaisha, Osaka, Japan

[*] Notice: The portion of the term of this patent subsequent to Aug. 25, 2009 has been disclaimed.

[21] Appl. No.: 764,519

[22] Filed: Sep. 24, 1991

[30] Foreign Application Priority Data

Sep. 26, 1990 [JP] Japan .................. 2-255980

[51] Int. Cl.$^5$ .................. G02F 1/1335; G02F 1/135; G02F 1/13
[52] U.S. Cl. .................. 359/67; 359/70; 359/72; 359/101
[58] Field of Search .................. 359/72, 70, 101, 67

[56] References Cited

U.S. PATENT DOCUMENTS

| | | | |
|---|---|---|---|
| 3,848,965 | 11/1974 | Adams, Jr. et al. | 359/72 |
| 4,246,302 | 1/1981 | Benton et al. | 359/43 X |
| 4,726,660 | 2/1988 | Rushford | 359/101 |
| 4,941,735 | 7/1990 | Moddel et al. | 359/67 |
| 5,142,391 | 8/1992 | Fujiwara et al. | 359/72 |
| 5,193,015 | 3/1993 | Shanks | 359/70 |

FOREIGN PATENT DOCUMENTS

| | | |
|---|---|---|
| 0329427 | 8/1989 | European Pat. Off. . |
| 61-043702 | 3/1986 | Japan . |
| 61-213803 | 9/1986 | Japan .................. 359/101 |
| 1-018130 | 1/1989 | Japan . |

OTHER PUBLICATIONS

Bearol et al, "Ac liquid crystal light valve", Appl. phys. lett. vol. 22, No. 3, Feb. 2, 1973, pp. 90–92.
Scheffer, "Twisted Nematic with Cholesteric Reflector", J. Phys. P: Appl. Phys. vol. 8, 1975, pp. 1441–1450.
White et al, "liquid crystal light valves", Electronics letters, vol. 6, No. 26, Dec. 1970 pp. 837–839.
Martin Schadt, Jurg funfschilling, "17A.1: Novel Polarized Liquid-Crystal Color Projection and New TN-LCD Operating Modes":, SID 90 Digest, pp. 324–326.

Primary Examiner—William L. Sikes
Assistant Examiner—Ron Trice
Attorney, Agent, or Firm—David G. Conlin; Peter F. Corless

[57] ABSTRACT

A liquid crystal display element of optical writing type, includes: a first transparent substrate; a first transparent electrode layer formed on the first transparent substrate; a photoconductive layer formed on the first transparent electrode layer; a light absorbing layer formed on the photoconductive layer; a light reflecting layer formed on the light absorbing layer and composed of a macro molecular film of cholesteric liquid crystal; a second transparent substrate; a second transparent electrode layer formed on the second transparent substrate; and a liquid crystal layer disposed between the second transparent electrode layer and the light reflecting layer.

9 Claims, 3 Drawing Sheets

LIQUID CRYSTAL DISPLAY DEVICE OF OPTICAL WRITING TYPE HAVING A CARBON DISPERSED LIGHT ABSORBING LAYER AND A CHOLESTERIC REFLECTOR

BACKGROUND OF THE INVENTION

1. Field of the Invention

The present invention relates to a liquid crystal display element of optical writing type, which is preferably utilized in a liquid crystal display apparatus of projection type.

2. Description of the Related Arts

In a liquid crystal display apparatus of projection type such as a projection type TV (television), a liquid crystal display element of optical writing type is utilized as a liquid crystal light valve. The inventors of the present application know one kind of such a liquid crystal display element, which is manufactured as following.

Namely, a first transparent electrode is formed on a first glass substrate. On this first transparent electrode, a photoconductive layer is formed of a hydrogenated amorphous silicon (a-Si:H). On this photoconductive layer, a light absorbing layer is formed of a thin film of carbon or metal such as silver. On this light absorbing layer, a dielectric mirror is formed of multiple layered films of titanium dioxide/silicon dioxide, zinc sulfide/magnesium fluoride, for example. On this dielectric mirror, a first orientation film is formed of a polyimide film which undergoes a molecular orientation treatment.

On the other hand, a second transparent electrode is formed on a second glass substrate. On this second transparent electrode, a second orientation film is formed. The first and second glass substrates, on which these films are thus formed, are attached to each other through a spacer, and a liquid crystal is disposed between the first and second orientation films, so as to form the liquid crystal layer therebetween.

On each of the outer surfaces of the first and second glass substrates, a reflection preventing film is formed so as to prevent the reflection of these glass surfaces. For the operation of thus constructed liquid crystal display element, an alternating voltage source is connected between the first and second transparent electrodes.

In the operation, when a laser beam as a writing light, is inputted to the liquid crystal display element from the side of the first glass substrate, the impedance of the photoconductive layer is reduced at an area which receives the laser beam. Thus, the orientation of the liquid crystal molecule is changed at this area since the voltage is applied to this area of the liquid crystal layer by the alternating voltage source.

At other area of the photoconductive layer which does not receive the laser beam, the impedance of the photoconductive layer is not changed, so that the orientation of the liquid crystal at this area is kept constant as its original state. As a result, an image is written in the liquid crystal display element according to the orientation change of each portion of the liquid crystal layer.

Then, a projection light i.e. a light for reading out the image written in the liquid crystal layer, is inputted to the liquid crystal display element from the side of the second glass substrate through a light polarization plate, so that the reflection light of the projection light, which is reflected at the dielectric mirror and which polarization direction is selectively changed by the liquid crystal layer, is projected onto the screen after passing through the light polarization plate again.

In the above mentioned case, the dielectric mirror is provided in the liquid crystal display element, with a purpose to reflect the projection light toward the screen and, at the same time, to prevent the projection light from entering the photoconductive layer by reflecting the projection light with a high reflection coefficient, so as not to change the impedance of the photoconductive layer by the projection light.

On the other hand, the light absorbing layer is provided in the liquid crystal display element, with a purpose to prevent the laser beam from reflecting again toward the photoconductive layer and, at the same time, to shut the projection light which has passed through the dielectric mirror.

As described above, the light reflecting layer i.e. the dielectric mirror, is indispensable in the liquid crystal display element of optical writing type when it is utilized in the liquid crystal display apparatus of projection type, and that, the dielectric mirror, which is made of insulation material to be reduced in conductivity, is utilized as this light reflecting layer. Here, the dielectric mirror is formed by vapor-depositing multiple layers of insulation films.

However, the vapor-depositing technique to form the multiple layers of insulation films, is rather complicated and difficult, with bringing a drawback that the overall manufacturing processes of the liquid crystal display element are made quite complicated and time and cost consuming, besides the cell structure itself of the liquid crystal display element, is made quite complicated.

SUMMARY OF THE INVENTION

It is therefore an object of the present invention to provide a liquid crystal display element of optical writing type, which can be easily manufactured, and can be made into a relatively simple structure.

According to the present invention, the above mentioned object can be achieved by a liquid crystal display element of optical writing type, including: a first transparent substrate; a first transparent electrode layer formed on the first transparent substrate; a photoconductive layer formed on the first transparent electrode layer; a light absorbing layer formed on the photoconductive layer; a light reflecting layer formed on the light absorbing layer and composed of a macro molecular film of cholesteric liquid crystal; a second transparent substrate; a second transparent electrode layer formed on the second transparent substrate; and a liquid crystal layer disposed between the second transparent electrode layer and the light reflecting layer.

In the liquid crystal display element, the light reflecting layer is composed of a macro molecular film of cholesteric liquid crystal, which has a circular polarization dichroism. Accordingly, the production of the light reflecting layer is quite easy compared with the case of the aforementioned related art, so that the overall manufacturing processes of the liquid crystal display element can be made simplified, and at the same time, the cell structure of the liquid crystal display element can be also made simplified.

Further objects and advantages of the present invention will be apparent from the following description of the preferred embodiment of the invention as illustrated in the accompanying drawings.

DETAILED DESCRIPTION OF THE PREFERRED EMBODIMENT

A preferred embodiment of the present invention will be described below with reference to the accompanying drawings.

Figure 1:
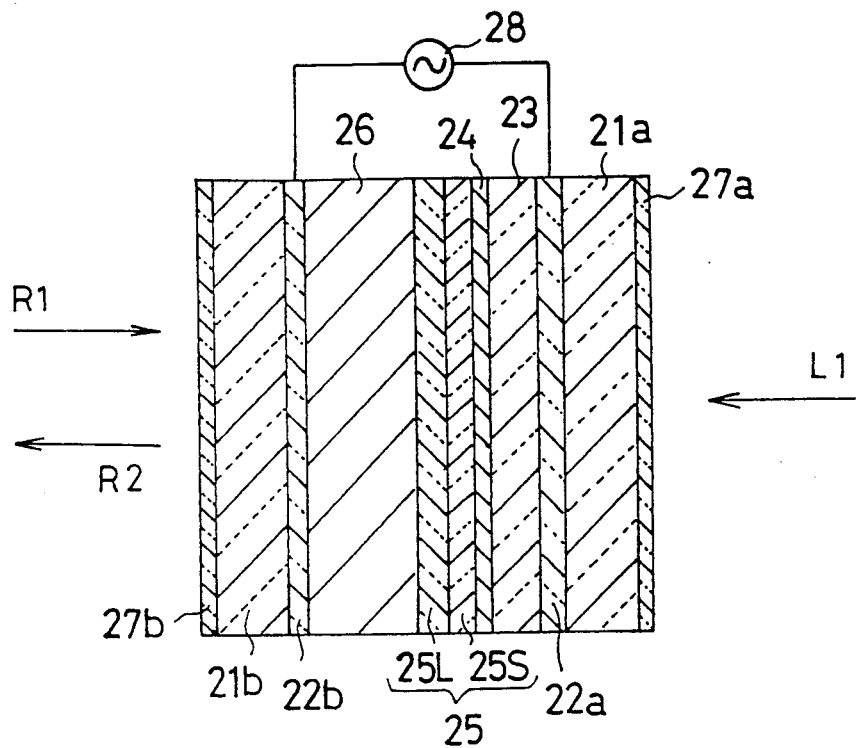
FIG. 1 is a cross sectional view of a liquid crystal display element as a first embodiment of the present invention.

In FIG. 1, a liquid crystal display element of optical writing type (liquid crystal light valve), is provided with a glass substrate 21a, and a transparent electrode film 22a. The transparent electrode film 22a includes layers of an ITO (Indium Tin Oxide) transparent conductive film and an $SnO_2$ (Tin Oxide) transparent conductive film, which are formed on the glass substrate 21a by means of a spattering technique.

The liquid crystal display element is also provided with a photoconductive layer 23, which consists of a hydrogenated amorphous silicon (a-Si:H) with a film thickness of 3 μm, on the transparent electrode film 22a. The photoconductive layer 23 is formed by means of a plasma CVD technique using a silane gas ($SiH_4$) and a hydrogen gas ($H_2$) as a material gas.

On the photoconductive layer 23, a light absorbing layer 24 is formed of coating material of carbon dispersed type, as one kind of organic film. The light absorbing layer 24 is formed by coating i.e. by means of a spinner coating technique using the coating material of carbon dispersed type, photo-polymerizing by a light exposure, and then burning for 1 hour with a burning temperature of 220° C.

This coating material of the carbon dispersed type, is made by dispersing the carbon black into an acrylic resin, and is formed to be a film with a film thickness of about 1.0 μm, with a resistivity of about $10^7$ Ω·cm, and with a photo-permeability of about 0.1% with respect to the visible light range. The photo-permeability and the resistivity of thus formed coating material of the carbon dispersed type, can be changed according to the amount of the dispersed carbon. Here, the photo-permeability is preferably not greater than 0.5%, and the resistivity is not less than $10^6$ Ω·cm, for the light absorbing layer 24 formed of this kind of coating material of the carbon dispersed type. The present applicants have proposed a liquid crystal display element of optical writing type, which is provided with such a light absorbing layer made of coating material of the carbon dispersed type, in the U.S. application Ser. No. 689,332 filed on Apr. 22, 1991.

On the light absorbing layer 24, a light reflecting layer 25 is formed of a macro molecular cholesteric liquid crystal having circular polarization dichroism. This light reflecting layer 25 is formed as following.

Namely, at first, poly-D-glutamic acid n-butyl ester is mixed with triethylene glycolic dimethacrylate as solution. Then, benzophenone is added to it as photosensitization while stirring it, and two glass substrates are positioned to sandwich it. Then, a macro molecular cholesteric liquid crystal film 25L is finally formed by exposing it with an ultra violet ray under a predetermined temperature so as to photo-polymerize it in a planar orientation.

At this time, since the film thickness of the thus formed film is about 0.2 mm, the refractive index is about 1.5 and the anisotropy of the refractive index is about 0.1, by setting the pitch 0.37 μm, the light reflecting layer 25 is adapted to reflect a levorotatory component of the light having a wavelength range of 550 nm±20 nm. This pitch indicates a length when the spiral of the liquid crystal is rotated by 360°, and a light having a specific wavelength can be selectively reflected by the light reflecting layer 25, according to the Bragg's reflection condition ($\lambda = n \cdot p \cdot \cos\theta$, wherein $\lambda$ represents the wavelength, n represents the refractive index, p represents the pitch, and $\theta$ represents the incident angle of the light). In the same manner as described above, a macro molecular liquid crystal film 25S is formed which is adapted to reflect the dextrorotatory component of the light by use of a poly-L-glutamic acid n-butyl ester.

Then, thus formed macro molecular liquid crystal films 25L and 25S are attached together to form the light reflecting layer 25 (notch filter) which can reflect the light having a wavelength of 550 nm±20 nm and is disposed on the light absorbing layer 24.

On the light reflecting layer 25, a liquid crystal layer 26 is disposed. As the liquid crystal layer 26, a scattering type liquid crystal compound film is utilized here. This liquid crystal compound film is formed as following. Namely, a homogeneous solution is made by mixing 30 wt % of bifunctional acrylate (HX-620 made by Nippon Kayaku Co., Ltd., for example) which is an UV (ultraviolet) polymerization compound, 70 wt % of nematic liquid crystal (ZLI-3201-000 made by Merck Co., Inc., for example), and a small amount of polymerization initiator (Darocure 1173 made by Merck Co., Inc.), and is filtered. Then the filtered solution is spinner-coated onto the light reflecting layer 25 with a film thickness of 10 μm, and is exposed by ultra-violet ray so as to photo-polymerize it.

On the liquid crystal layer 26, an opposing layered body of a transparent electrode film 22b and a glass substrate 21b is disposed. This opposing layered body is formed as following. Namely, the transparent electrode film 22b is formed of an ITO transparent conductive film on the glass substrate 21b, by means of a spattering technique.

On the outer side surface of the glass substrates 21a and 21b, reflection preventing films 27a and 27b are respectively formed, in order to prevent the light reflection on these outer side surfaces of the glass substrates 21a and 21b, by means of a vapor-depositing technique. The liquid crystal display element is adapted such that an alternating voltage can be applied between the transparent electrode films 22a and 22b by an alternating voltage source 28.

In a condition that this alternating voltage is supplied from the alternating voltage source 28, when a laser beam L1 is inputted to the liquid crystal display element from the side of the glass substrate 21a, the impedance of the photoconductive layer 23 is reduced at an area that receives the laser beam L1, so that the alternating voltage supplied by the alternating voltage source 28 is applied to the liquid crystal layer 26 through the films 22a and 22b, and the orientation of the liquid crystal molecule is changed at this area. On the other hand, at other area that does not receive the laser beam L1, the impedance of the photoconductive layer 23 is not changed, so that the liquid crystal molecule in the liquid crystal layer 26 keeps its original orientation condition. As a result, an image corresponding to the laser beam L1 as the writing light, is formed in the liquid crystal layer 26.

In the above mentioned embodiment, the acrylic resin is utilized as the coating material of the carbon dispersed type for the light absorbing layer 24. A polyamide or a polyimide can be utilized as a photo-polymerizing type, and an epoxy resin can be utilized as a heat-polymerizing type for the light absorbing layer 24. The pitch of the light reflecting layer 25 (notch filter) can be easily and desirably changed by changing the temperature at the polymerization process, the type of the solution, or the mixing ratio of the solution and the liquid crystal material, and thus the wavelength of the light to be reflected can be also freely changed. Accordingly, by combining a plurality of the reflection layers having different wavelength characteristics, the liquid crystal display element of the present embodiment can be adapted to deal with color image display. In the above mentioned embodiment, the order of the aforementioned levororation and dextrorotation as for the light reflecting layer 25 may be reversed.

As a liquid crystal display mode of the liquid crystal layer 26, any one of a dynamic scattering mode, a guest host mode, and a phase transition mode can be utilized in place of the scattering mode of the liquid crystal layer 26 in the present embodiment.

Figure 2:
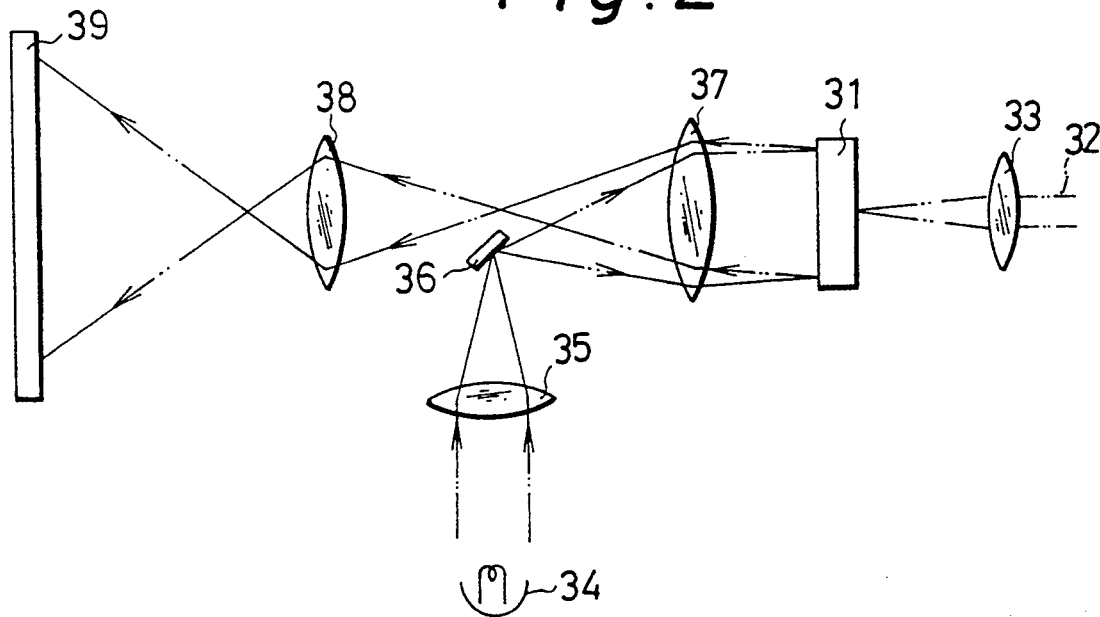
FIG. 2 is a schematic constructional view of an optical system of a liquid crystal display apparatus employing the liquid crystal display element of FIG. 1 as a light valve.

FIG. 2 shows the main construction of the optical system of a liquid crystal display apparatus of projection type, which employs the liquid crystal display element of the above described embodiment of FIG. 1, as a light modulating device (light valve).

In FIG. 2, the reference numeral 31 designates the liquid crystal display element of FIG. 1, in which the image is formed in advance, as above mentioned. Namely, the image forming process is performed in advance, by inputting the laser beam 32 from the side of the glass substrate 21a (FIG. 1) through the lens 33. Here, in place of the laser beam 32, a light emitted from a CRT, a flat panel display (liquid crystal, PDP, LED etc.) may be utilized as the writing light.

At this condition, a projection light as a reading light from a light source 34 is inputted to the liquid crystal display element 31 from the side of the glass substrate 21b (FIG. 1), through a lens 35, a mirror 36 and a lens 37. At the area of the liquid crystal layer 26 (FIG. 1) in the liquid crystal display element 31 where the orientation of the liquid crystal molecule is kept in its original state, the inputted light is scattered and does not return to a lens 37, so that the area on a screen 39 corresponding to this area becomes in a dark condition. On the other hand, at the area of the liquid crystal layer 26 (FIG. 1) where the orientation of the liquid crystal molecule is changed, since the liquid crystal layer 26 becomes transparent, a portion of the inputted light having a specific wavelength (550 nm±20 nm) is selectively reflected by the light reflecting layer 25 (FIG. 1).

Then, in FIG. 2, the reflected light from the liquid crystal display element 31 is inputted to the lens 38 via the lens 37, and is magnified there. Consequently, the image written in the liquid crystal display element 31 is projected onto the screen 39.

In this liquid crystal display apparatus, as shown in FIG. 2, since a polarization beam splitter, which is employed in the liquid crystal display apparatus of FIG. 4 and explained later, is omitted, the image projected onto the screen 39 can be made bright by the amount corresponding to this absence of the beam splitter.

Figure 3:
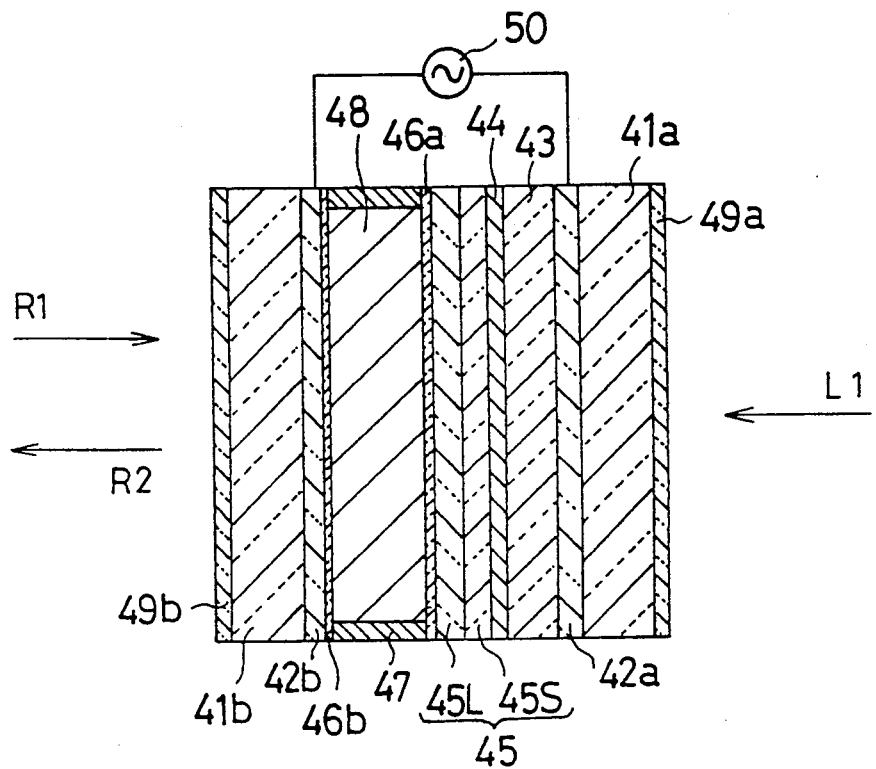
FIG. 3 is a cross sectional view of a liquid crystal display element as a second embodiment of the present invention.

FIG. 3 shows another liquid crystal display element as a second embodiment of the present invention.

In FIG. 3, a liquid crystal display element of optical writing type, is provided with a glass substrate 41a, and a transparent electrode film 42a. The transparent electrode film 42a includes layers of an ITO transparent conductive film and an $SnO_2$ transparent conductive film, which are formed on the glass substrate 41a by means of a spattering technique.

The liquid crystal display element is also provided with a photoconductive layer 43, which consists of a hydrogenated amorphous silicon (a-Si:H) with a film thickness of 3 μm, on the transparent electrode film 42a. The photoconductive layer 43 is formed by means of a plasma CVD technique using a silane gas ($SiH_4$) and a hydrogen gas ($H_2$) as a material gas.

On the photoconductive layer 43, a light absorbing layer 44 is formed of coating material of carbon dispersed type, as one kind of organic film. The light absorbing layer 44 is formed by coating i.e. by means of a spinner coating technique using the coating material of carbon dispersed type, photo-polymerizing by a light exposure, and then burning for 1 hour with a burning temperature of 220° C.

This coating material of the carbon dispersed type, is made by dispersing the carbon black into an acrylic resin, and is formed to be a film with a film thickness of about 1.0 μm, with a resistivity of about $10^7$ Ω·cm, and with a photo-permeability of about 0.1% with respect to the visible light range. The photo-permeability and the resistivity of thus formed coating material of the carbon dispersed type, can be changed according to the amount of the dispersed carbon. Here, the photo-permeability is preferably not greater than 0.5%, and the resistivity is not less than $10^6$ Ω·cm, for the light absorbing layer 44 formed of this kind of coating material of the carbon dispersed type (as explained in the aforementioned U.S. application Ser. No. 689,332).

On the light absorbing layer 44, a light reflecting layer 45 is formed of a macro molecular cholesteric liquid crystal having circular polarization dichroism. This light reflecting layer 45 is formed as following.

Namely, at first, poly-D-glutamic acid n-butyl ester is mixed with triethylene glycolic dimethacrylate as solution. Then, benzophenone is added to it as photosensitization while stirring it, and two glass substrates are positioned to sandwich it. Then, a macro molecular cholesteric liquid crystal film 45L is finally formed by exposing it with an ultra violet ray under a predetermined temperature so as to photo-polymerize it in a planar orientation.

At this time, since the film thickness of the thus formed film is about 0.2 mm, the refractive index is about 1.5 and the anisotropy of the refractive index is about 0.1, by setting the pitch 0.37 μm, the light reflecting layer 45 is adapted to reflect a levorotatory component of the light having a wavelength range of 550 mm±20 nm. This pitch indicates a length when the spiral of the liquid crystal is rotated by 360°, and a light having a specific wavelength can be selectively reflected by the light reflecting layer 45, according to the Bragg's reflection condition ($\lambda = n \cdot p \cdot \cos\theta$, wherein $\lambda$ represents the wavelength, n represents the refractive index, p represents the pitch, and $\theta$ represents the incident angle of the light). In the same manner as described above, a macro molecular liquid crystal film 45S is formed which is adapted to reflect the dextrorotatory component of the light by use of a poly-L-glutamic acid n-butyl ester.

Then, thus formed macro molecular liquid crystal films 45L and 45S are attached together to form the light reflecting layer 45 (notch filter) which can reflect the light having a wavelength of 550 nm±20 nm and is disposed on the light absorbing layer 44.

On the light reflecting layer 45, an orientation film 46a is formed. The orientation film 46a is formed by spinner-coating a polyimide film and rubbing it as an molecular orientation treatment.

The orientation film 46a and an opposing layered body, which consists of an orientation film 46b, a transparent electrode film 42b and a glass substrate 41b, are attached together through a spacer 47, as shown in the figure. This opposing layered body is formed as following. Namely, the transparent electrode film 42b is formed of an ITO transparent conductive film on the glass substrate 41b, by means of a spattering technique. Then, the orientation film 46b is formed on the transparent electrode film 42b, in the same manner as the orientation film 46a.

The thickness of the space between the orientation films 46a and 46b is about 6 µm, to which a liquid crystal is introduced and packed to form a liquid crystal layer 48. As the liquid crystal for the liquid crystal layer 48, a phenyle cyclo-hexane type nematic liquid crystal is employed, so that the hybrid electric field effect mode is enabled as the operation mode of the liquid crystal display element of the present embodiment.

On the outer side surface of the glass substrates 41a and 41b, reflection preventing films 49a and 49b are respectively formed, in order to prevent the light reflection on these outer side surfaces of the glass substrates 41a and 41b, by means of a vapor-depositing technique. The liquid crystal display element is adapted such that an alternating voltage can be applied between the transparent electrode films 42a and 42b by an alternating voltage source 50.

In the above mentioned embodiment, the acrylic resin is utilized as the coating material of the carbon dispersed type for the light absorbing layer 44. A polyamide or a polyimide can be utilized as a photo-polymerizing type, and an epoxy resin can be utilized as a heat-polymerizing type for the light absorbing layer 44.

As a liquid crystal display mode for the nematic liquid crystal as in the liquid crystal layer 48 of the present embodiment, either of a twisted nematic mode and an electric field effect induction birefringence mode, can be utilized in place of the hybrid electric field effect mode of the present embodiment.

As the liquid crystal for the liquid crystal layer 48, a ferroelectric liquid crystal, anti-ferroelectric liquid crystal, or a smectic liquid crystal having electroclinic effect, can be utilized in place of the nematic liquid crystal of the present embodiment.

In a condition that the alternating voltage is supplied from the alternating voltage source 50, when a laser beam L1 is inputted to the liquid crystal display element from the side of the glass substrate 41a, the impedance of the photoconductive layer 43 is reduced at an area that receives the laser beam L1, so that the alternating voltage supplied by the alternating voltage source 50 is applied to the liquid crystal layer 48 through the films 42a and 42b, and the orientation of the liquid crystal molecule is changed at this area. On the other hand, at other area that does not receive the laser beam L1, the impedance of the photoconductive layer 43 is not changed, so that the liquid crystal molecule in the liquid crystal layer 48 keeps its original orientation condition. As a result, an image corresponding to the laser beam L1 as the writing light, is formed in the liquid crystal layer 48.

Figure 4:
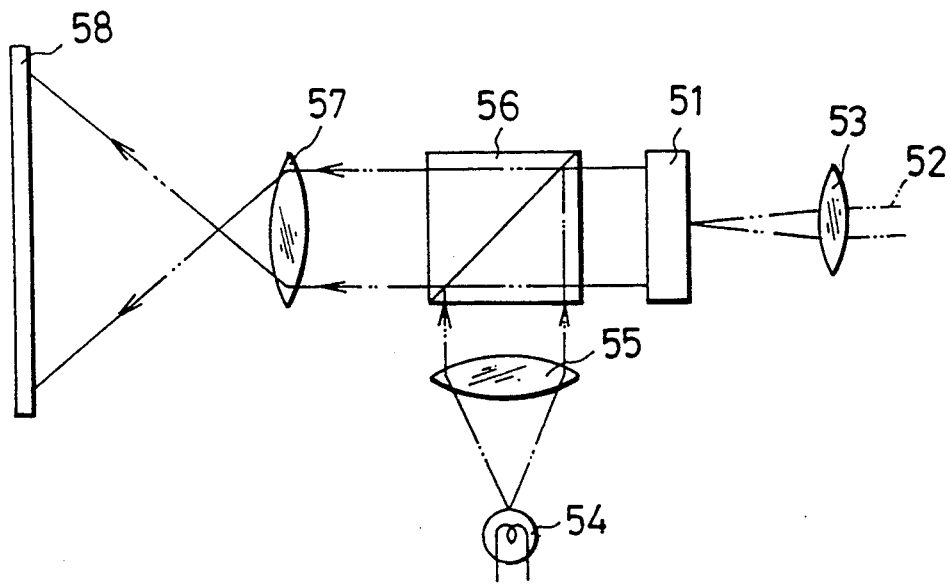
FIG. 4 is a schematic constructional view of an optical system of a liquid crystal display apparatus employing the liquid crystal display element of FIG. 3 as a light valve.

FIG. 4 shows the main construction of the optical system of a liquid crystal display apparatus of projection type, which employs the liquid crystal display element of the above described embodiment of FIG. 3, as a light modulating device.

In FIG. 4, the reference numeral 51 designates the liquid crystal display element of FIG. 3, in which the image is formed in advance, as above mentioned. Namely, the image forming process is performed in advance, by inputting the laser beam 52 from the side of the glass substrate 41a (FIG. 3) through the lens 53. Here, in place of the laser beam 52, a light emitted from a CRT, a flat panel display (liquid crystal, PDP, LED etc.) may be utilized as the writing light.

At this condition, a projection light as a reading light from a light source 54 is inputted to the liquid crystal display element 51 from the side of the glass substrate 41b (FIG. 3), through a lens 55, and a polarization beam splitter 56. At the area of the liquid crystal layer 48 (FIG. 3) in the liquid crystal display element 51 where the orientation of the liquid crystal molecule is kept in its original state, since the polarization direction is not changed with respect to this inputted light, the reflection light having a specific wavelength and reflected by the light reflecting layer 45, can not pass through the beam splitter 56, so that the area on a screen 58 corresponding to this area becomes in a dark condition. On the other hand, the reflection light passing through the area of the liquid crystal layer 48 (FIG. 3) where the orientation of the liquid crystal molecule is changed, since the polarization direction is changed due to the electric optical effect, the reflection light reflected from the light reflecting layer 45 can pass through the beam splitter 56. Then, in FIG. 4, the reflected light from the liquid crystal display element 51 is inputted to the lens 57 via the lens beam splitter 56, and is magnified there. Consequently, the image written in the liquid crystal display element 51 is projected onto the screen 58.

Figure 5:
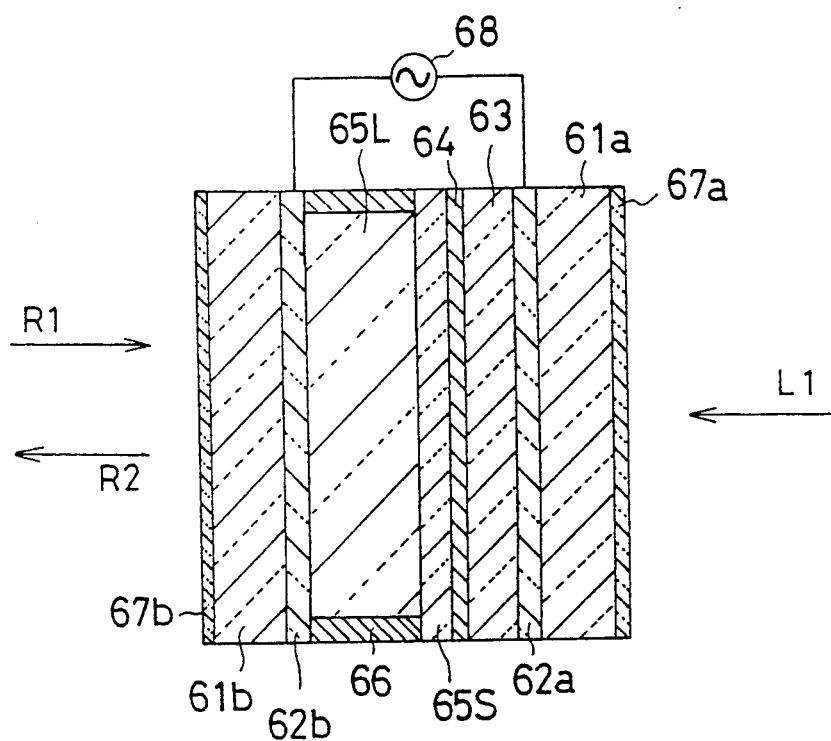
FIG. 5 is a cross sectional view of a liquid crystal display element as a third embodiment of the present invention.

FIG. 5 shows another liquid crystal display element as a third embodiment of the present invention.

In FIG. 5, a liquid crystal display element of optical writing type, is provided with a glass substrate 61a, and a transparent electrode film 62a. The transparent electrode film 62a includes layers of an ITO transparent conductive film and an SnO$_2$ transparent conductive film, which are formed on the glass substrate 61a by means of a spattering technique.

The liquid crystal display element is also provided with a photoconductive layer 63, which consists of a hydrogenated amorphous silicon (a-Si:H) with a film thickness of 3 µm, on the transparent electrode film 62a. The photoconductive layer 63 is formed by means of a plasma CVD technique using a silane gas (SiH$_4$) and a hydrogen gas (H$_2$) as a material gas.

On the photoconductive layer 63, a light absorbing layer 64 is formed of coating material of carbon dispersed type, as one kind of organic film. The light absorbing layer 64 is formed by coating i.e. by means of a spinner coating technique using the coating material of carbon dispersed type, photo-polymerizing by a light exposure, and then burning for 1 hour with a burning temperature of 220° C.

This coating material of the carbon dispersed type, is made by dispersing the carbon black into an acrylic resin, and is formed to be a film with a film thickness of about 1.0 μm, with a resistivity of about $10^7$ Ω·cm, and with a photo-permeability of about 0.1% with respect to the visible light range. The photo-permeability and the resistivity of thus formed coating material of the carbon dispersed type, can be changed according to the amount of the dispersed carbon. Here, the photo-permeability is preferably not greater than 0.5%, and the resistivity is not less than $10^6$ Ω·cm, for the light absorbing layer 64 formed of this kind of coating material of the carbon dispersed type (as explained in the aforementioned U.S. application Ser. No. 689,332).

On the light absorbing layer 64, a light reflecting layer 65 is formed. The light reflecting layer 65 includes a macro molecular cholesteric liquid crystal layer 65S and a low molecular cholesteric liquid crystal layer 65L, wherein the low molecular cholesteric liquid crystal layer 65L serves also as a liquid crystal layer of the present embodiment. The macro molecular cholesteric liquid crystal layer 65S is formed as following.

Namely, at first, poly-L-glutamic acid n-butyl ester is mixed with triethylene glycolic dimethacrylate as solution. Then, benzophenone is added to it as photosensitization while stirring it, and two glass substrates are positioned to sandwich it. Then, a macro molecular cholesteric liquid crystal layer 65S is finally formed on the light absorbing layer 64 by exposing it with an ultra violet ray under a predetermined temperature so as to photo-polymerize it in a planar orientation.

At this time, since the film thickness of the thus formed film is about 0.2 mm, the refractive index is about 1.5 and the anisotropy of the refractive index is about 0.1, by setting the pitch 0.37 μm, the light reflecting layer 65 is adapted to reflect a dextrorotatory component of the light having a wavelength range of 550 nm±20 nm. This pitch indicates a length when the spiral of the liquid crystal is rotated by 360°, and a light having a specific wavelength can be selectively reflected by the light reflecting layer 65, according to the Bragg's reflection condition ($\lambda = n \cdot p \cdot \cos\theta$, wherein $\lambda$ represents the wavelength, n represents the refractive index, p represents the pitch, and $\theta$ represents the incident angle of the light).

On the macro molecular cholesteric liquid crystal layer 65S, the low molecular cholesteric liquid crystal layer 65L is formed. As the low molecular liquid crystal for the low molecular cholesteric liquid crystal layer 65L, a cholesteric oleyl carbonate (COC) is used, to which a nematic liquid crystal (3090 made by Roche Co. Inc.) having a structure of not less than three members ring including chlorine in the molecular minor axis direction, so as to enable driving the low molecular cholesteric liquid crystal layer 65L by two frequencies. Here, the product (p·n) of the pitch (p) and the refractive index (n) of the low molecular cholesteric liquid crystal layer 65L is made equal to that of the macro molecular cholesteric liquid crystal layer 65S, while the direction of the spiral of the low molecular cholesteric liquid crystal layer 65L is opposite to that of the macro molecular cholesteric liquid crystal layer 65S. The cell thickness of the low molecular cholesteric liquid crystal layer 65L is 6 μm. The cell thickness of the macro molecular cholesteric liquid crystal layer 65S is 0.2 mm.

On the low molecular cholesteric liquid crystal layer 65L with a spacer 66, an opposing layered body of a transparent electrode film 62b and a glass substrate 61b is disposed. This opposing layered body is formed as following. Namely, the transparent electrode film 62b is formed of an ITO transparent conductive film on the glass substrate 61b, by means of a spattering technique.

On the outer side surfaces of the glass substrates 61a and 61b, reflection preventing films 67a and 67b are respectively formed, in order to prevent the light reflection on these outer side surfaces of the glass substrates 61a and 61b, by means of a vapor-depositing technique. The liquid crystal display element is adapted such that an alternating voltage can be applied between the transparent electrode films 62a and 62b by an alternating voltage source 68.

In the above mentioned embodiment, the acrylic resin is utilized as the coating material of the carbon dispersed type for the light absorbing layer 64. A polyamide or a polyimide can be utilized as a photo-polymerizing type, and an epoxy resin can be utilized as a heat-polymerizing type for the light absorbing layer 64.

In the present embodiment, though the dextrorotatory liquid crystal is used for the macro molecular cholesteric liquid crystal layer 65S while the levorotatory liquid crystal is used for the low molecular cholesteric liquid crystal layer 65L in combination, the levorotatory liquid crystal may be used for the macro molecular cholesteric liquid crystal layer 65S while the dextrorotatory liquid crystal may be used for the low molecular cholesteric liquid crystal layer 65L in combination.

In a condition that the alternating voltage is supplied from the alternating voltage source 68, when a laser beam L1 is inputted to the liquid crystal display element from the side of the glass substrate 61a, the impedance of the photoconductive layer 63 is reduced at an area that receives the laser beam L1, so that the alternating voltage supplied by the alternating voltage source 68 is applied to the low molecular cholesteric liquid crystal layer 65L through the films 62a and 62b, and the orientation of the liquid crystal molecule is changed at this area. On the other hand, at other area that does not receive the laser beam L1, the impedance of the photoconductive layer 63 is not changed, so that the liquid crystal molecule in the low molecular cholesteric liquid crystal layer 65L keeps its original orientation condition. Namely, in the present embodiment, the light having a set prescribed wavelength is selectively reflected, and this condition is broken when the voltage is applied, so that the inputted light is scattered at the low molecular cholesteric liquid crystal layer 65L. As a result, an image corresponding to the laser beam L1 as the writing light, is formed in the low molecular cholesteric liquid crystal layer 65L. Erasing the image written in the low molecular cholesteric liquid crystal layer 65L can be executed by applying a high frequency.

A structure and an operation of a liquid crystal display apparatus of projection type employing the above described liquid crystal display element of FIG. 5 as a light modulating device, are substantially same as those of FIG. 2, and the explanation of this display apparatus is omitted.

In the above described embodiments, the glass substrate is utilized as the transparent substrate. However, this is not necessary, but an optical fiber plate made of optical fibers etc., may be utilized to form the transparent substrate, in place of the glass substrate.

As described above in detail, according to those embodiments of the present invention, each light reflecting layer 25, 45, 65S can be formed of a macro molecular film of cholesteric liquid crystal, which has a circular polarization dichroism. Accordingly, the production of the light reflecting layer is quite easy compared with the case of the aforementioned related art, so that the overall manufacturing processes of the liquid crystal display element can be made simplified, and at the same time, the cell structure of the liquid crystal display element can be also made simplified.

Many widely different embodiments of the present invention may be constricted without departing from the spirit and scope of the present invention. It should be understood that the present invention is not limited to the specific embodiments described in this specification, except as defined in the appended claims.

What is claimed is:

1. A liquid crystal display element of optical writing type, comprising:
   a first transparent substrate;
   a first transparent electrode layer formed on said first transparent substrate;
   a photoconductive layer formed on said first transparent electrode layer;
   a light absorbing layer formed on said photoconductive layer and composed of a coating material of a carbon dispersed type;
   a light reflecting layer for reflecting light of a predetermined wavelength formed on said light absorbing layer and comprising a macro molecular film of cholesteric liquid crystal
   a second transparent substrate;
   a second transparent electrode layer formed on said second transparent substrate; and
   a liquid crystal layer disposed between said second transparent electrode layer and said light reflecting layer.

2. A liquid crystal element according to claim 1, wherein said light reflecting layer includes two macro molecular films.

3. A liquid crystal element according to claim 2, wherein one of said macro molecular films is levorotatory type and the other of said macro molecular films is dextrorotatory type.

4. A liquid crystal display element according to claim 1, wherein said liquid crystal layer comprises a low molecular film of cholesteric liquid crystal, which spiral direction is opposite of that of said macro molecular film and reflects light of said predetermined wavelength.

5. A liquid crystal display element according to claim 4, wherein a product of a pitch and a refractive index of said low molecular film is equal to a product of a pitch and a refractive index of said macro molecular film.

6. A liquid crystal display element according to claim 1, wherein said liquid crystal layer comprises a scattering type liquid crystal compound film.

7. A liquid crystal display element according to claim 1, further comprising:
   a first orientation film formed on said light reflecting layer; and
   a second orientation film formed on said second transparent electrode layer.

8. A liquid crystal display element according to claim 7, wherein said liquid crystal layer comprises a nematic liquid crystal.

9. A liquid crystal display element according to claim 1, further comprising:
   a first reflection preventing film formed on said first substrate at the outer side of said second transparent substrate; and
   a second reflection preventing film formed on said second substrate at the outer side of said first transparent substrate.

* * * * *